United States Patent [19]

Knutson

[11] 4,093,036
[45] June 6, 1978

[54] IRRIGATION TOWER DRIVE

[76] Inventor: Glenn C. Knutson, Rte. 1, Box 141, Centerville, S. Dak. 57014

[21] Appl. No.: 721,322

[22] Filed: Sep. 7, 1976

[51] Int. Cl.² .......................................... B60K 17/04
[52] U.S. Cl. .............................. 180/70 R; 180/14 R; 239/212; 74/415
[58] Field of Search ................. 180/14 R, 66 R, 70 R; 74/415, 416; 137/344; 239/177, 212

[56] References Cited

U.S. PATENT DOCUMENTS

| 616,381 | 12/1898 | White | 74/415 |
|---|---|---|---|
| 1,914,797 | 6/1933 | Baker | 74/415 |
| 2,963,103 | 12/1960 | Wood | 74/415 X |
| 3,360,200 | 12/1967 | Purtell | 137/344 X |
| 3,623,662 | 11/1971 | Reinke | 239/177 |
| 3,954,120 | 5/1976 | Zimmerer | 137/344 |

Primary Examiner—Joseph F. Peters, Jr.
Assistant Examiner—Terrance L. Siemens
Attorney, Agent, or Firm—Clarence A. O'Brien; Harvey B. Jacobson

[57] ABSTRACT

An irrigation tower structure is provided including support and drive wheels for supporting and driving the tower from and over ground to be irrigated. The tower has a driven shaft journalled therefrom and wheel driving shafts journalled therefrom. A plurality of numerically high ratio sets of meshed gears drivingly connect the driven shaft to the wheel driving shafts and each set of meshed gears includes a first gear mounted on a support shaft therefor and having a plurality of rollers generally paralleling, supported from and spaced equally about and radially outwardly from the support shaft and a second gear mounted on a support shaft therefor including an outer peripheral portion defining a plurality of outwardly opening notches formed in and spaced about the outer peripheral portion, the first gear of each set being meshed with the second gear of the corresponding set with the rollers of each first gear successively engageable in the notches spaced about the outer peripheral portion of the corresponding second gear.

3 Claims, 8 Drawing Figures

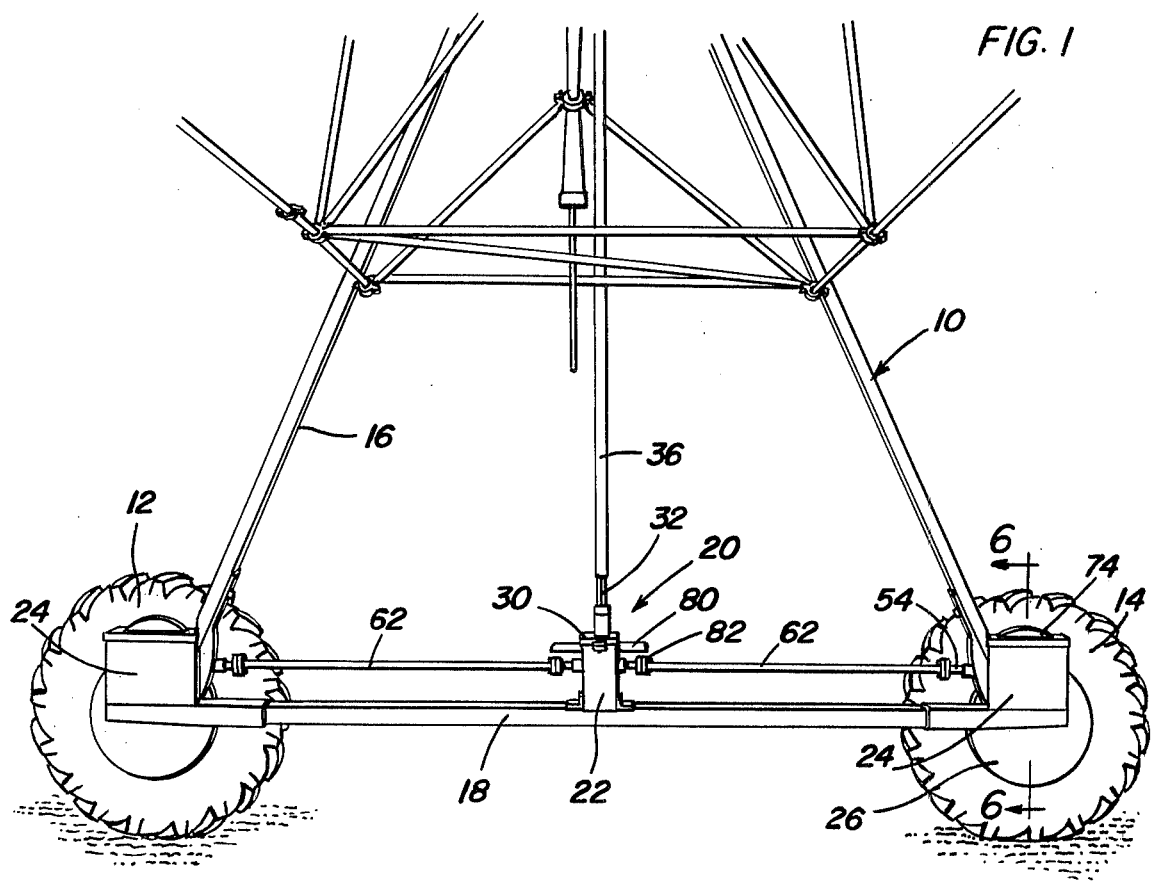
FIG. 1
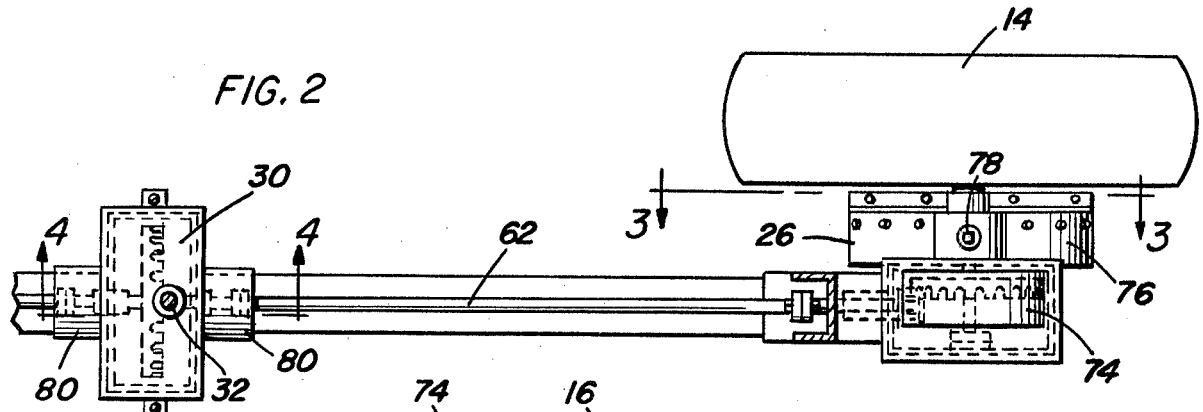
FIG. 2
FIG. 3
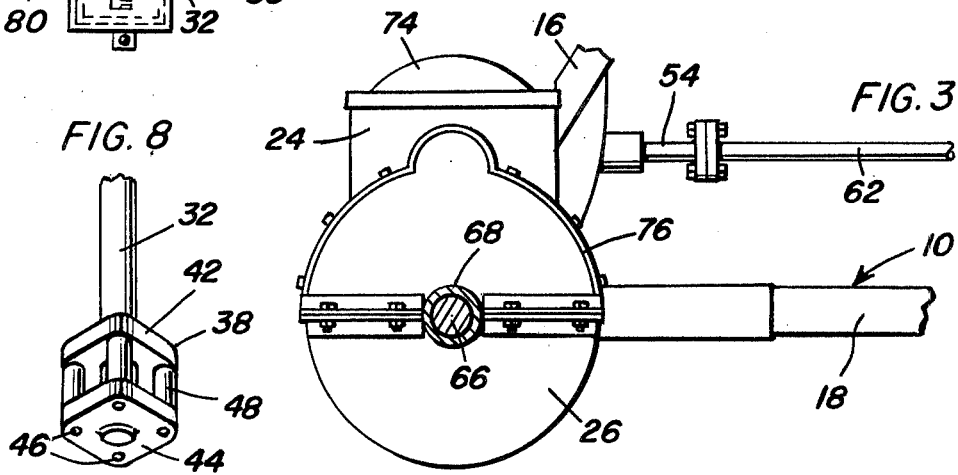
FIG. 8

IRRIGATION TOWER DRIVE

BACKGROUND OF THE INVENTION

Irrigation towers utilized in irrigating cultivated land are usually provided with support and drive wheels capable of slowly advancing the tower over the land to be irrigated. Inasmuch as the tower wheels are driven very slowly various operating problems are encountered. One problem stems from the tendency of the necessary numerically high ratio drive train for the wheels tending to drive the wheels with surges in driving torque. Another problem is encountered when a tower is moving down an incline and the tower drive mechanism tends to be driven by the tower. In addition, other problems of operation are encountered specific to the various different drive mechanisms heretofore utilized.

Various forms of irrigation tower drive mechanisms including some of the general structural and operational features of the instant invention are disclosed in U.S. Pat. Nos. 2,054,554, 3,771,719, 3,831,692 and Re. 28,728.

BRIEF DESCRIPTION OF THE INVENTION

The irrigation tower drive mechanism of the instant invention utilizes a sufficiently numerically high ratio drive train to reduce the tendency of the tower to overdrive the drive train when the tower is proceeding down an incline and a drive mechanism which is constructed in a manner tending to reduce surges in torque applied to the support and drive wheels of the tower. In addition, the drive system of the irrigation tower is constructed in a manner whereby the portions thereof subject to malfunction are completely enlosed within housing portions therefor having wet sump lubrication means. Still further, the irrigation tower drive mechanism is constructed in a manner so that it may be readily incorporated in various different forms of irrigation towers.

The main object of this invention is to provide an irrigation tower drive mechanism which will be operative to lessen the tendency of surges in driving torque being applied to the support and drive wheels of the associated tower.

Another object of this invention is to provide an irrigation tower drive mechanism which will reduce the tendency of the tower to overdrive the drive mechanism when the tower is preceeding down an incline.

Another very important object of this invention is to provide an irrigation tower drive mechanism constructed in a manner whereby the driving torque transferring components thereof are completely enclosed within housings therefor provided with wet sump lubrication means.

Another object of this invention is to provide an irrigation tower drive which may be readily coupled to and driven by various different forms of tower driving motor means.

A final object of this invention to be specifically enumerated herein is to provide an irrigation tower drive structure which will conform to conventional forms of manufacture, be of simple construction and dependable in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a fragmentary side elevational view of the lower portion of an irrigation tower illustrating the drive assembly of the instant invention operatively coupled to the support and drive wheels of the tower;

FIG. 2 is an enlarged fragmentary horizontal sectional view illustrating the right hand portion of the drive assembly illustrated in FIG. 1;

FIG. 3 is a fragmentary enlarged vertical sectional view taken substantially upon the plane indicated by the section line 3—3 of FIG. 2;

FIG. 8 is a fragmentary perspective view of a torque input gear wheel in the drive assembly.

DETAILED DESCRIPTION OF THE INVENTION

Figure 4:
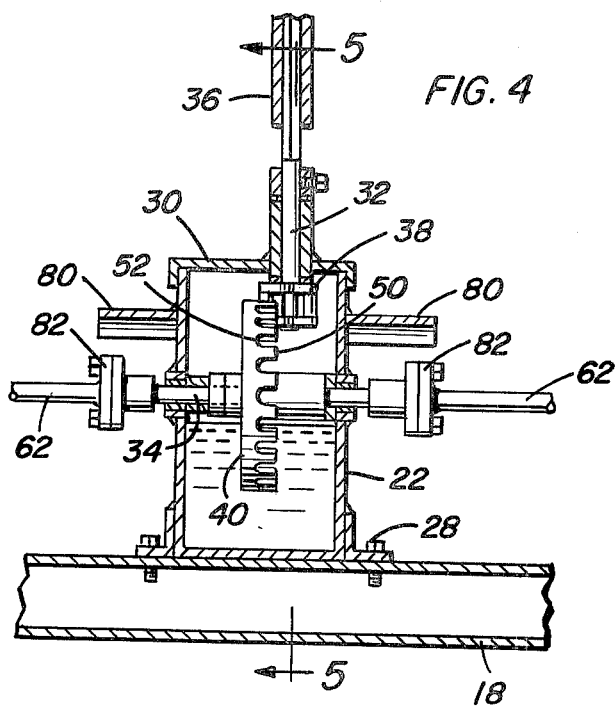
FIG. 4 is an enlarged fragmentary vertical sectional view taken substantially upon the plane indicated by the section line 4—4 of FIG. 2.
Figure 5:
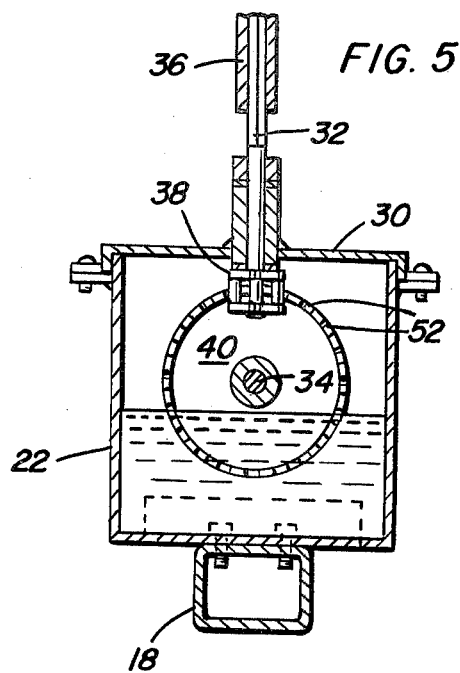
FIG. 5 is a fragmentary vertical sectional view taken substantially upon the plane indicated by the section line 5—5 of FIG. 4.
Figure 6:
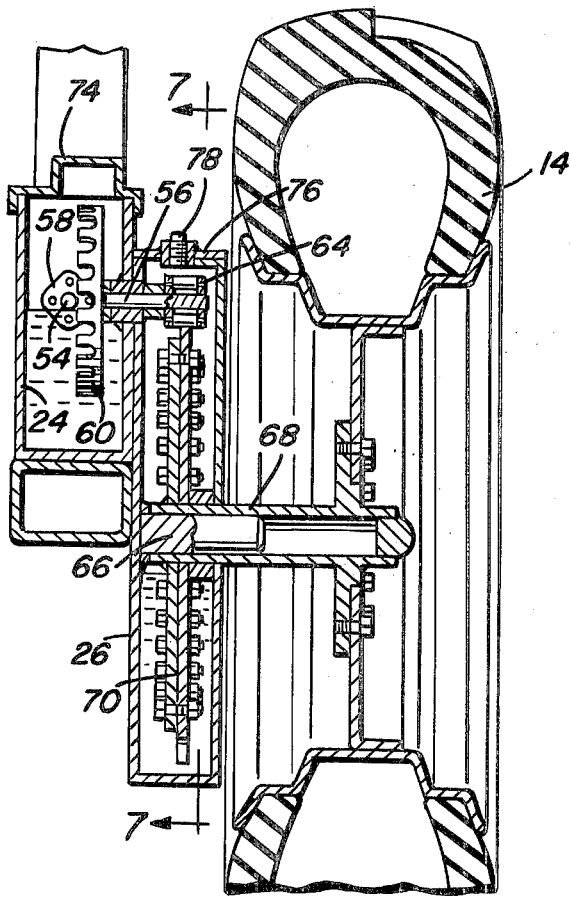
FIG. 6 is an enlarged fragmentary vertical sectional view taken substantially upon the plane indicated by the section line 6—6 of FIG. 1.

Referring now more specifically to the drawings to the numeral 10 generally designates an irrigation tower including front and rear wheels 12 and 14. The tower 10 includes a framework 16 including a lower horizontal front to rear extending frame member 18 and the wheels 12 and 14 are supported from opposite ends of the frame member 18.

The tower 10 includes a drive assembly referred to in general by the reference numeral 20 and the assembly 20 includes a first gear housing 22, a pair of second gear housings 24 and a pair of third gear housings 26.

The housing 22 is supported by means of fasteners 28 from a mid-portion of the frame member 18 and includes a removable cover 30 closing the upper open end of the housing 22. First and second driven and drive shafts 32 and 34 are journalled through the top wall or cover 30 and remote side walls of the housing 22, respectively, and the upper end of the shaft 32 is splined and telescoped and keyed into the lower end of a drive shaft 36 journalled from the tower 10, suitable motor means of any desirable type being drivingly coupled to the upper end of the drive shaft 36. The motor means for driving the drive shaft 36 may include an electric motor, a hydraulic motor, a drive shaft driven from a remote location and driving coupled to the drive shaft 36 and various other driving mechanisms conventionally utilized on irrigation towers.

A first gear wheel 38 is mounted on the lower end of the shaft 32 and a second gear wheel 40 is mounted on the shaft 34. The gear wheel 38 includes a pair of axially spaced plates 42 and 44 mounted on the shaft 32 and having a plurality of equally circumferentially spaced axle pins 46 extending between and rigidly secured at their opposite ends to the plates 42 and 44. Each of the pins 46 has a roller 48 journalled thereon. The gear wheel 40 includes an outer peripheral axially projecting cylindrical flange 50 having a plurality of outwardly opening generally U-shaped notches 52 formed therein and spaced equally thereabout. The notches 52 open outwardly of the free axial end of the cylindrical flange 50 and the rollers 48 of the gear wheel 38 are successively engageable in the notches 52 whereby rotation of the shaft 32 will effect rotation of the shaft 34.

Each of the housings 24 includes a shaft 54 corresponding to the shaft 32 journalled through one side wall thereof and a shaft 56 journalled through another side wall thereof disposed at right angles to the shaft 54 and corresponding to the shaft 34. The shafts 54 and 56 have gear wheels 58 and 60 corresponding to the gear wheels 38 and 40 mounted thereon within the corresponding housing 24 and disposed in meshed engagement. The outer ends of the shafts 54 are aligned with the adjacent ends of the shaft 34 and connecting shafts 62 extend between opposite ends of the shaft 34 and the corresponding shafts 54 and are coupled thereto for transmitting torque from the shaft 34 to the shafts 54.

Each of the housings 26 comprises a housing separate from the corresponding housing 24 and the end of each shaft 56 remote from the corresponding gear wheel 60 projects through the corresponding side wall of the housing 24 and the opposing side wall of the corresponding housing 26 and has a gear wheel 64 mounted thereon corresponding to the gear wheel 38. In addition, each housing 26 supports a stationary shaft 66 therein including one end portion which projects through one side wall of the housing 26 and a drive sleeve 68 is journalled on each shaft 66 and includes an outer end portion projecting away from the housing 26 having the associated wheel mounted thereon for rotation therewith. Each sleeve 68 includes a gear wheel 70 mounted thereon similar to the gear wheels 40 and 60, but being devoid of a flange corresponding to the flange 50 and instead including circumferentially spaced radially outwardly opening notches 72 corresponding to the notches 52. Of course, the rollers of the gear wheels 64 are engageable in the notches 72 of the gear wheels 70.

The housings 24 and 26 include removable covers 74 and 76 closing the open upper portions of the housing 24 and 26 and each cover 76 includes a filler opening in which a threaded closure plug 78 is removably secured.

Figure 7:
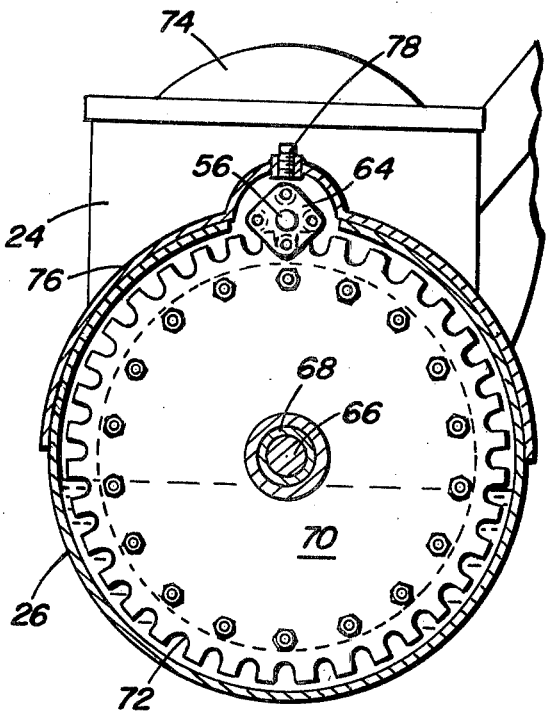
FIG. 7 is a fragmentary vertical sectional view taken substantially upon the plane indicated by the section line 7—7 of FIG. 6.

It will of course be understood that while the notches in the gear wheel 60 illustrated in FIG. 7 open away from the corresponding wheel 14, the notches in the corresponding gear wheel provided to drive the wheel 12 will open toward the latter in order that the wheels 12 and 14 may be driven in the same direction as a result of rotation of the shaft 34. Further, the cover 74 of the housing 24 enclosing the gears for driving the wheels 12 may be reversed in end to end relation so as to provide adequate clearance for the upper peripheral portion of the corresponding gear wheel 60.

If it is desired, suitable clutch means may be provided for establishing drive connections between the sleeves 68 and the wheels 12 and 14 and each pair of corresponding housings 24 and 26 and the associated wheel may be supported from the lower end of the tower 10 for selective 90° angular displacement about an upstanding axis. In this manner, the wheels 12 and 14 may be disconnected from the drive assembly 20 and turned so as to enable a plurality of aligned towers to be trailed behind a draft vehicle.

The housings 22, 24 and 26 include closed lower portions in which suitable lubricating liquid may be disposed to a level above the lower peripheral portions of the notched gear wheels therein in order to insure proper lubrication of the various sets of meshed gear wheels. Further, the housing 22 may be constructed in a manner, through the utilization of a right angle drive assembly, so that the shaft 32 is journalled through one side wall of the housing 22 below the cover 30 thereof and it may be seen from FIGS. 2 and 4 of the drawings that the walls of the housing 22 through which the opposite ends of the shaft 34 project include outwardly projecting shields 80 which overlie and afford protection to the couplings 82 by which the adjacent ends of the shafts 62 are coupled to the shaft 34.

Utilization of the rollers 48 on each of the gear wheels 38, 58 and 64 greatly increases the efficiency of the reduction gear train drivingly connecting the shaft 32 to the wheels 12 and 14.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an irrigation tower including support and driven wheel means for supporting and driving said tower from and over ground to be irrigated, said tower including a first pair of generally right angularly disposed driven and drive shafts journalled therefrom, compact numerically high ratio drive means drivingly connecting said drive shaft to said wheel means, said drive means including first driven means driving said drive shaft from said driven shaft, said first drive means including a pair of gear wheels consisting of a first small diameter gear wheel on said driven shaft having a plurality of rollers generally paralleling, supported from and spaced equally about and radially outwardly from said driven shaft and journalled from the latter and a second large diameter gear wheel mounted on said drive shaft, said second gear wheel including an outer peripheral cylindrical portion having a plurality of axially outwardly opening notches formed in and spaced about one axial end of said outer peripheral portion, said first gear wheel being disposed in meshed engagement with said second gear wheel with successive rollers of said first gear wheel engageable in the notches spaced about said outer peripheral portion, said notches being generally U-shaped in configuration, said drive means including second drive means including a second pair of right angularly disposed driven and drive shafts having first and second small and large diameter gear wheels thereon including rollers and notches, respectively, corresponding to the first mentioned rollers and notches and meshed with each other, the drive shaft of the first pair of shafts driving the driven shaft of said second pair of shafts, said driven shaft of said second pair of shafts being driven from and coaxial with the drive shaft of said first pair of shafts, said drive means including third drive means including a third pair of driven and drive shafts also having first and second small and large diameter gear wheels thereon including rollers and notches, respectively, corresponding to the first mentioned rollers and notches, the drive shaft of said second pair of shafts comprising the drive shaft of said third pair of shafts, said driven and drive shafts of said third pair of shafts paralleling each other and the peripheral notches on said second gear wheel of the drive shaft of said third pair of shafts opening radially outwardly of that drive shaft.

2. The combination of claim 1 wherein said tower includes front and rear wheels comprising said support and drive wheel means, said first pair of driven and drive shafts being disposed between said wheels and disposed transverse and parallel, respectively, to a path extending between said wheels.

3. A compact numerically high ratio right angle drive train including first and second driven and drive shafts journalled for rotation about first and second generally right angularly disposed axes, a pair of gear wheels consisting of a first small diameter gear wheel on said driven shaft having a plurality of rollers generally paralleling, supported from and spaced equally about and radially outwardly from said driven shaft and journalled from the latter and a second large diameter gear wheel mounted on said drive shaft, said second gear wheel including a cylindrical outer peripheral portion having a plurality of axially endwise outwardly opening notches formed therein and spaced about said outer peripheral portion, said first gear wheel being disposed in meshed engagement with said second gear wheel with successive rollers of said first gear wheel engageable in the notches spaced about said outer cylindrical peripheral portion, said notches being generally U-shaped in configuration.

* * * * *